United States Patent [19]

Schlüter

[11] Patent Number: 5,400,693
[45] Date of Patent: Mar. 28, 1995

[54] BRAKE PRESSURE BOOSTER

[75] Inventor: Peter Schlüter, Kammerforst, Germany

[73] Assignee: Lucas Industries public limited company, Solihull, United Kingdom

[21] Appl. No.: 103,524

[22] Filed: Aug. 9, 1993

[30] Foreign Application Priority Data

Aug. 26, 1992 [DE] Germany .................. 42 28 277.2

[51] Int. Cl.$^6$ .................................................. B60T 13/57
[52] U.S. Cl. ................................. 91/376 R; 91/33; 91/448
[58] Field of Search .................. 91/19, 28, 29, 32, 33, 91/369.1, 376 R, 448

[56] References Cited

U.S. PATENT DOCUMENTS

| 3,410,179 | 11/1968 | Kytta et al. ............. 91/376 R |
| 3,525,287 | 8/1970 | Reynolds .................... 91/33 |
| 3,768,366 | 10/1973 | Grabb et al. ............. 91/29 X |
| 3,780,620 | 12/1973 | Gardner ................ 91/376 R X |
| 3,831,489 | 8/1974 | Woo ........................... 91/32 |
| 3,880,049 | 4/1975 | Grabb et al. ............... 91/33 |
| 4,208,872 | 6/1980 | Shimizu et al. ........... 91/32 X |
| 4,633,757 | 1/1987 | Kubota .................... 91/33 X |
| 5,005,465 | 4/1991 | Boehm et al. ........ 91/376 R X |
| 5,046,314 | 9/1991 | Levrai . | |

FOREIGN PATENT DOCUMENTS

| 136689 | 4/1985 | European Pat. Off. ......... 91/376 R |
| 0368691A1 | 10/1989 | European Pat. Off. . | |
| 9202154 U | 5/1992 | Germany . | |
| 117874 | 9/1979 | Japan ........................... 91/29 |
| 57-4450 | 1/1982 | Japan ........................... 91/28 |

OTHER PUBLICATIONS

Patents Abstracts of Japan, M-341 Nov. 30, 1984, vol. 8/ No. 262-No. 59-134047(A), Aug. 1, 1984.

Primary Examiner—Edward K. Look
Assistant Examiner—John Ryznic
Attorney, Agent, or Firm—Oblon, Spivak, McClelland, Maier & Neustadt

[57] ABSTRACT

A brake pressure booster for a vehicle brake system comprises a vacuum booster which includes two chambers, the low pressure chamber (16) of which is evacuated during actuation in a brake pressure boosting fashion, while a pressure higher than that in the low pressure chamber is adjustable in the high pressure chamber (14) by means of a control valve (28), the higher pressure exceeding the external atmospheric pressure. That is accomplished by a mechanical regulating valve (12) connected upstream of the control valve (28). Upon connection of a pressure source (18) to the high pressure chamber (14), a valve seat controlling access from the pressure source (18) to the valve opens before another valve seat closes that controls the connection between an inlet (24) into the valve and the high pressure chamber (14).

1 Claim, 4 Drawing Sheets

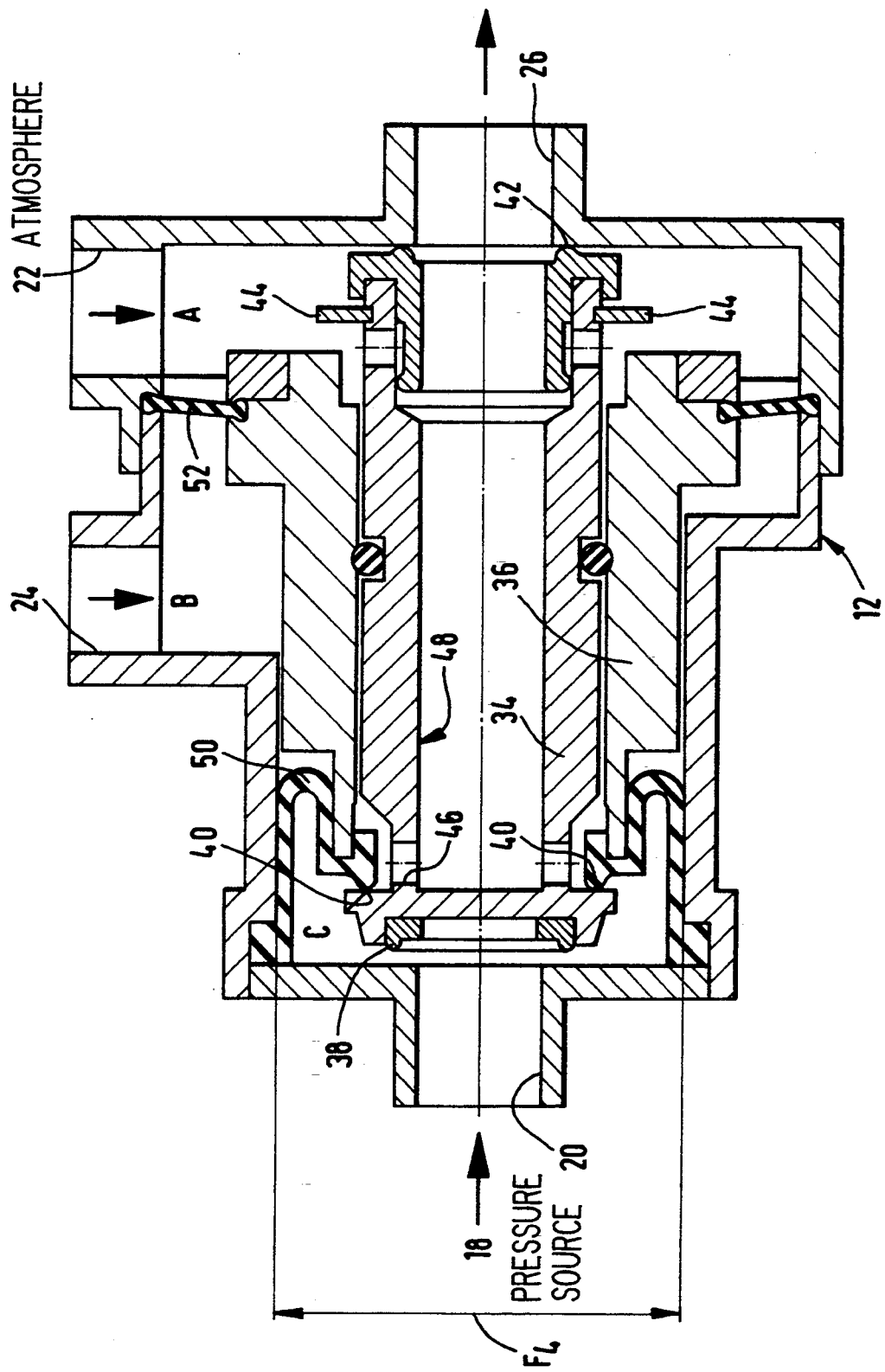

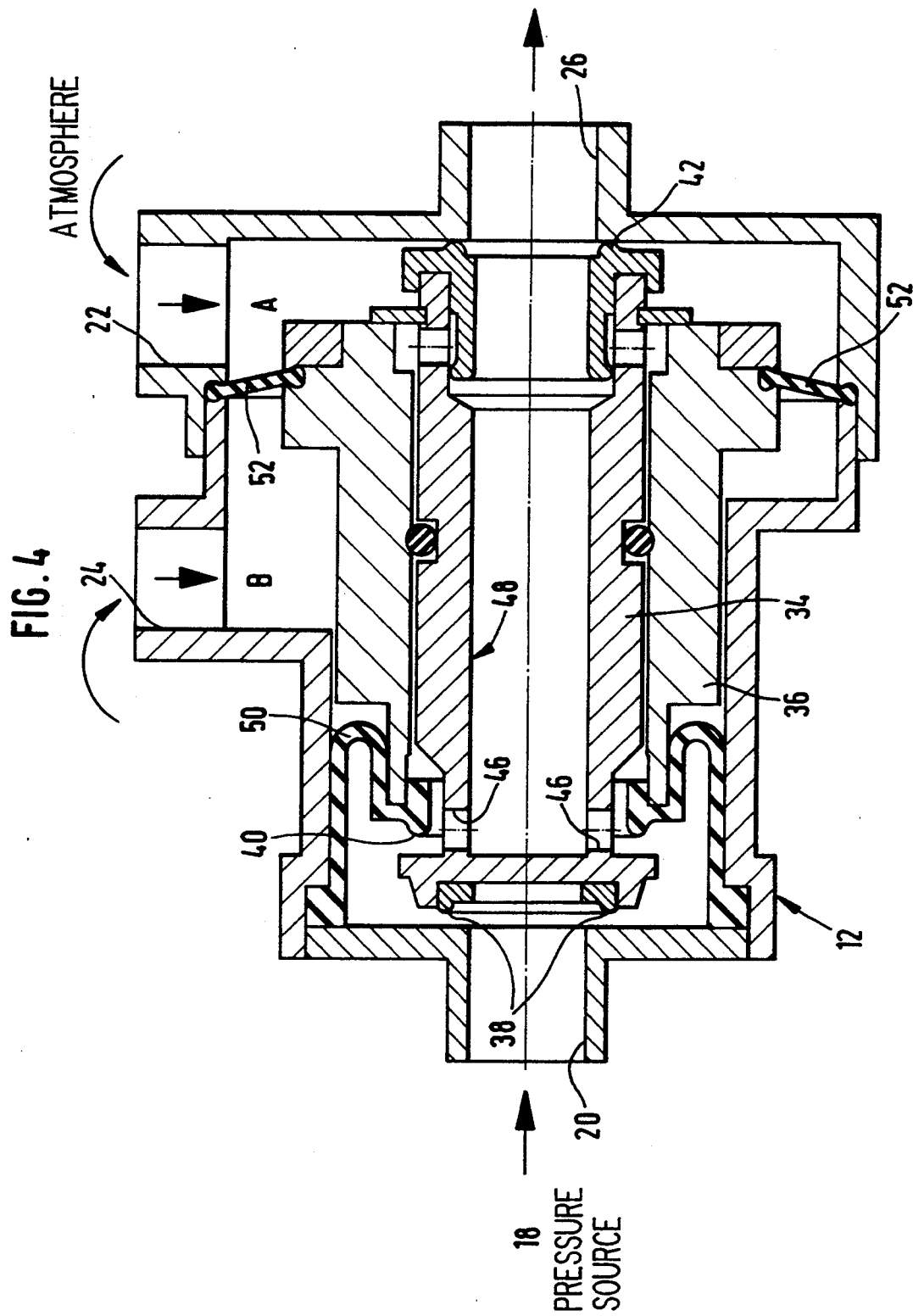

BRAKE PRESSURE BOOSTER

FIELD OF THE INVENTION

The instant invention relates to a brake pressure booster for a vehicle brake system comprising a vacuum booster which includes two chambers, the low pressure chamber of which is evacuated during actuation in a brake pressure boosting fashion, while a pressure higher than that in the low pressure chamber is adjustable in the high pressure chamber by means of a control valve, the higher pressure corresponding at least to the external atmospheric pressure.

BACKGROUND OF THE INVENTION

Those skilled in the art are familiar, in general, with brake pressure boosters of this kind (see, e.g. DE-GM 92 02 154.9).

In known brake pressure boosters making use of vacuum, the low pressure chamber normally is evacuated to a value of e.g. 0.2 bar, while pressures between 0.2 and 1 bar are adjusted in the high pressure chamber, depending upon the boosting effect desired. The boost obtainable when using a conventional brake pressure booster of this kind thus corresponds to a pressure difference of approximately 0.8 bar.

Often not only a vacuum source is available in motor vehicles. Likewise to be made available in simple manner is a source of air having a pressure which is higher than that of the external atmosphere (hereinafter referred briefly as "atmospheric pressure").

A brake pressure booster including the features recited in the precharacterizing part of claim 1 is known from JP 59-134 047 A (Patents Abstracts of Japan, Section M, vol. 8, 1984, no. 262 (11-341). In that case, however, the switchover of operation of the brake pressure booster is effected under conditions at which pressure is fed into the high pressure chamber of the brake pressure booster, in which chamber the pressure is higher than atmospheric pressure, with losses occurring in respect of the pressurized air. In other words, air from the pressure source gets lost upon switchover. This loss of compressed air is unavoidable in the prior art device cited, which is known from JP 59-1343 047, because a slide valve is provided which must adopt an intermediate position upon switchover, for reasons of safety and functioning. And while in this intermediate position, the air pressure source and the inlet of the valve leading to the outside atmosphere are interconnected temporarily.

Also EP 0 368 691 A1 describes a brake pressure booster with which a pressure source is used to feed air of higher pressure than the outside atmospheric pressure into the booster. With this prior art, however, the supply of pressurized air is controlled entirely separately, i.e. irrespective of the feeding of air into the high pressure chamber of the brake pressure booster at pressures below atmospheric. This prior art furthermore is disadvantageous because the compressed air pressurizes only a limited ring section (bellows) so that the resulting brake pressure booster on the whole becomes quite large.

SUMMARY OF THE INVENTION

The invention has for its aim to devise a brake pressure booster including the features recited in the preamble of the claim, in such a way that optimum loss-free use of the air from the pressure source is guaranteed and, at the same time, the device is highly reliable in operation, of simple structure and small size.

A solution of this problem in accordance with the invention is characterized in the claim.

The valve provided according to the invention, a valve which functions purely mechanically, (hereinafter referred to as "regulating valve") utilizes the pressure in the high pressure chamber of the brake pressure booster as the control magnitude for its own self-control. The control is realized by comparing the instantaneous pressure in the high pressure chamber of the vacuum booster with the pressure prevailing in the outside atmosphere (atmospheric pressure). In response to this control (opening and closing) of the valve, high pressure (in other words pressure which is greater than the external atmospheric pressure) is introduced into the high pressure chamber of the brake pressure booster when atmospheric pressure is reached in the high pressure chamber. This makes it possible to achieve a smooth, continuous transition without any jerks from conventional pressurizing of a vacuum booster with vacuum, on the one hand, and pressure up to atmospheric pressure, on the other hand, to utilization of a pressure source which provides air under positive pressure (i.e. a pressure that is higher than atmospheric pressure).

The invention preferably makes use of a conventional vacuum booster which the present specification assumes to be known.

BRIEF DESCRIPTION OF THE DRAWING

An embodiment of the invention will be described in greater detail below, with reference to the drawing, in which:

FIGS. 2 to 4 illustrate the regulating valve in detail in various operating positions.

DESCRIPTION OF THE PREFERRED EMBODIMENT

Figure 1:
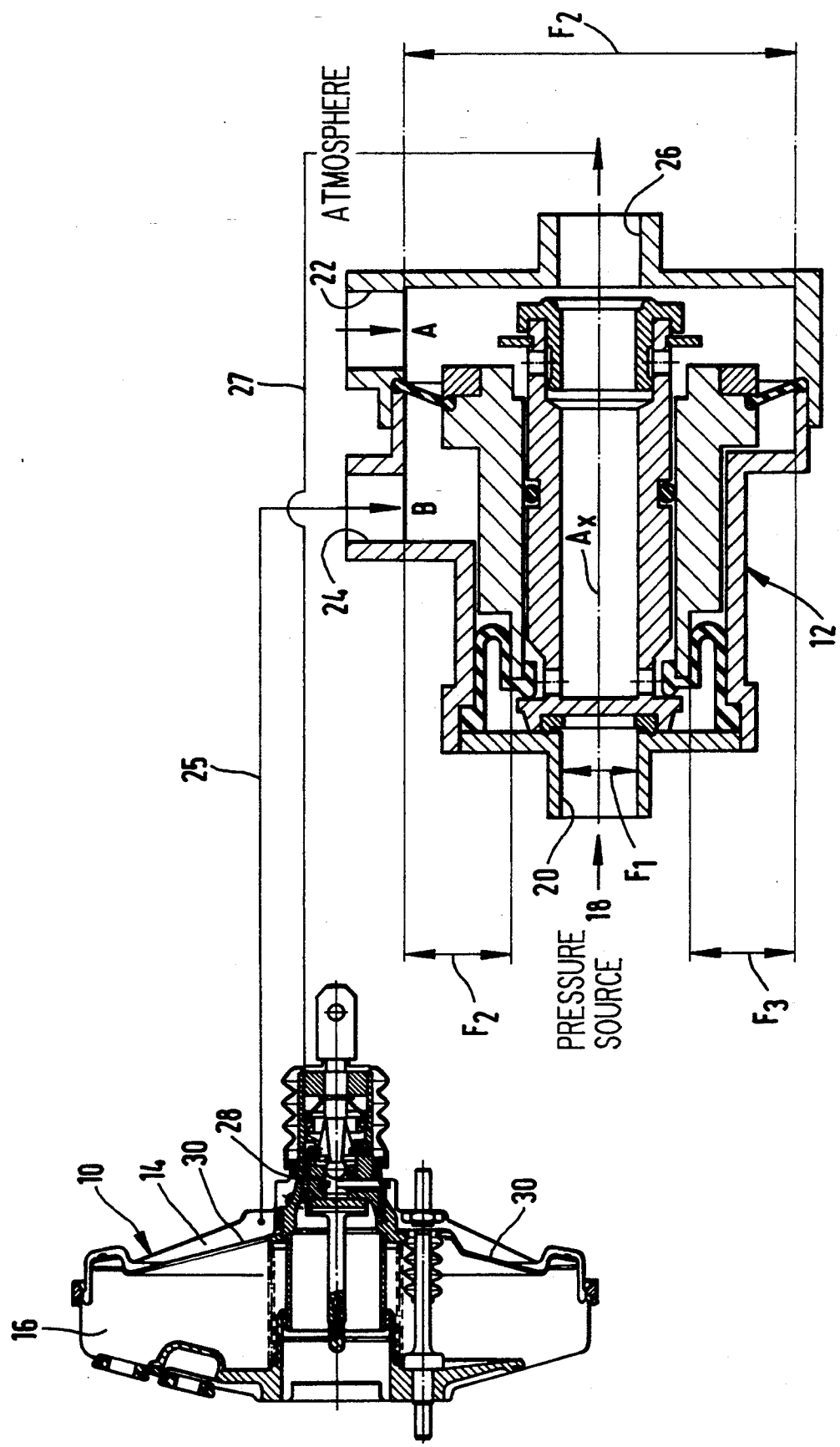
FIG. 1 is a diagrammatic presentation of a vacuum booster, comprising an additional regulating valve for connection of a pressure source.

FIG. 1 illustrates a conventional brake pressure booster 10 (cf. e.g. DE-GM 92 02 154.9) comprising a high pressure chamber 14 and a low pressure chamber 16. Low pressure, typically of a value of about 0.2 bar, is generated in conventional manner in the low pressure chamber 16.

FIG. 1 further shows a valve 12 which is connected to the vacuum booster 10 to permit the selective connection of a pressure source 18 to the high pressure chamber 14 of the vacuum booster 10. The pressure source 18 is merely indicated diagrammatically by an arrow in FIG. 1. A pressure source 18 in the present context is understood to be a source which provides air at a pressure above that of the external atmosphere (atmospheric pressure), for example air at pressures of from 1.2 to 1.3 bar.

The regulating valve 12 has altogether four connections:

Air at high pressure supplied by the pressure source 18 can be admitted into the valve through an inlet 20 (when the valve is in corresponding position), an inlet 22 admits air at atmospheric pressure into a space A of the valve (inlet 22 thus communicates with the outside atmosphere), inlet 24 connects the valve 12 to the high pressure chamber 14 of the vacuum booster 10, whereby a space B which communicates with inlet 24 receives air which has the same pressure as the air in the high pressure chamber 14, and an outlet 26 of the valve 12 is connected through a conduit 27 to a per se known control valve 28 of the vacuum booster 10. Usually, upon application of the brakes, the control valve 28 is acted upon in such a way that more or less air, depending on the degree of brake pressure boosting, is admitted successively into the high pressure chamber 14 of the vacuum booster 10. As the control valve 28 belongs to the state of the art it will not be described in any greater detail. Likewise part of the art is the operating piston 30 of the vacuum booster 10; it is moved to the left in FIG. 1 as the pressure rises in the high pressure chamber 14 so as to reinforce the brake pressure in per se known manner.

When the vacuum that can be generated in the vehicle brake system reaches a value of e.g. 0.2 bar, control valve 28 acts to adjust the air pressure in the high pressure chamber 14 to a value between 0.2 and 1 bar (atmospheric pressure). Thereupon the conventional arrangement would not allow any further pressure increase to be effected in the high pressure chamber 14 so that the maximum brake pressure boost obtainable would correspond to a pressure differential of approximately 0.8 bar.

In the case of the arrangement shown in FIG. 1, the provision of a pressure source 18 which generates pressure above the atmospheric level supplies air at higher pressure from the pressure source 18 through the valve 12 into the conduit 27 when atmospheric pressure is reached in the high pressure chamber 14. In this manner pressures higher than atmospheric can be obtained in the high pressure chamber 14 and the range of brake pressure boosting can be broadened accordingly. This transition of the system, including the pressure source 18, should take place as continuously as possible and without any abrupt variations.

That is accomplished by means of the regulating valve 12.

In terms of function, the regulating valve 12 is disposed upstream of the control valve 28 of the vacuum booster 10. This means that all the air supplied to the vacuum booster 10, i.e. air from the outside atmosphere within the "normal range" of brake pressure boosting as well as air from the pressure source 18, is fed through the regulating valve 12 into the vacuum booster 10. As a consequence, the control valve 28 of the brake pressure booster 10 carries out a force/path control function across the entire pressure range adjustable in its high pressure chamber 14 (here e.g. from 0.2 to 1.3 bar). In accordance with the invention, the pressure range above 1 bar is opened continuously (without any sudden changes).

Use of the regulating valve 12 with an additional pressure source 18 merely requires the connection of inlets 20, 22, 24 and the outlet 26. Therefore, the regulating valve 12 either may be positioned outside of and remote from the brake pressure booster 10 or provided as an integrated component thereof.

The regulating valve 12 has a valve body 32 and inner and outer regulating pistons 34 and 36, respectively. Both pistons are supported so as to be movable each with respect to the longitudinal axis Ax of the valve 12.

Figure 2:
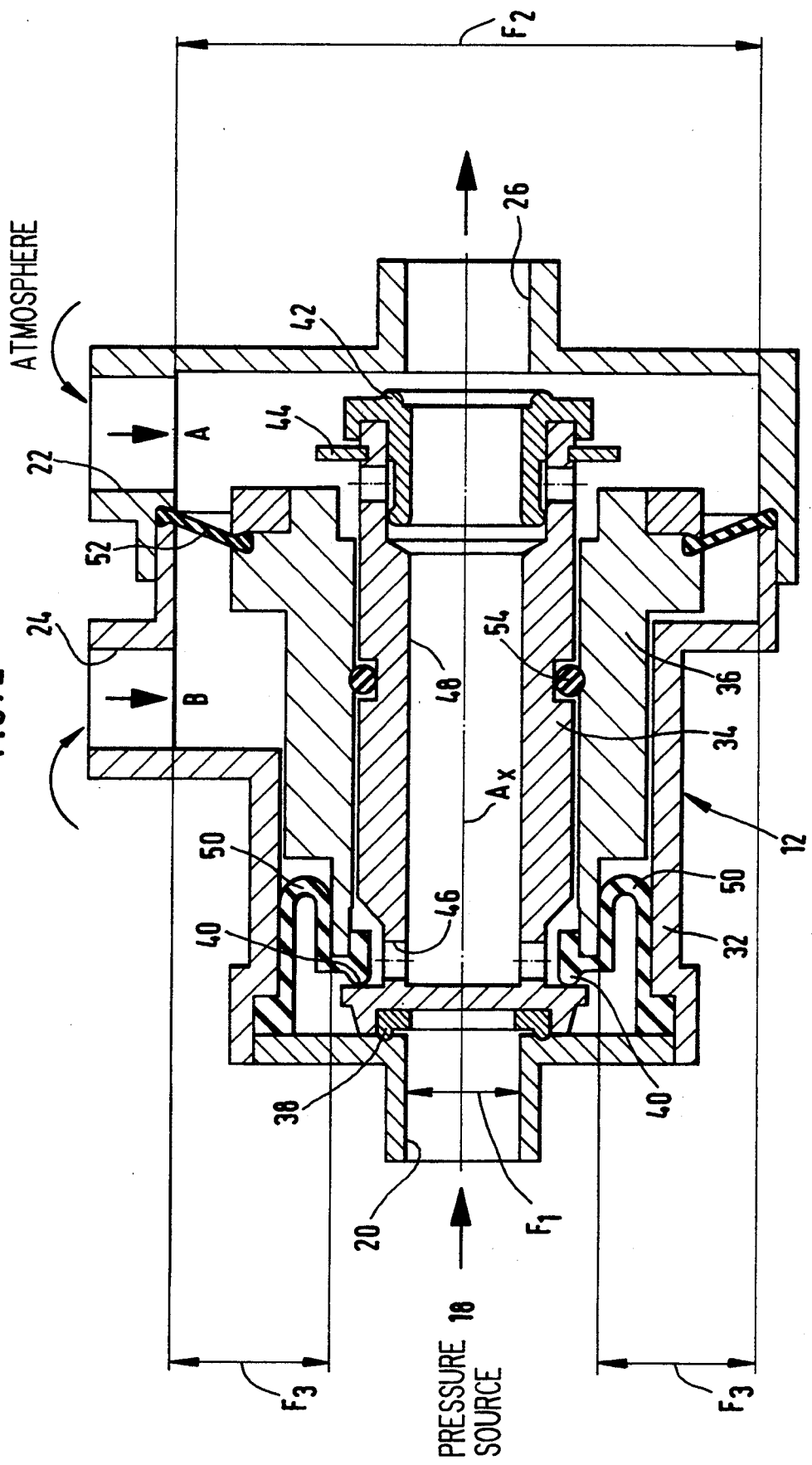

As shown in FIGS. 2 to 4, the inner regulating piston 34 has a valve seat 38 at the left and a valve seat 42 at the right. The outer regulating piston 36 has a valve seat 40 at the left, adapted for engagement with a corresponding stop at the inner regulating piston 34.

Moreover, a stop 44 is firmly connected to the inner regulating piston 34 and adapted for engagement with the outer regulating piston 36.

A transverse bore 46 establishes a connection between an axial bore 48 formed in the inner regulating piston 34 and the space outside of the inner regulating piston 34.

The outer regulating piston 36 slides in axially sealed fashion (seal 54) along the inner regulating piston 34 while being connected at both ends to the external body 32 by means of flexible sleeves 50 and 52, respectively.

The regulating valve 12 operates as follows:

FIG. 2 illustrates the starting position of the whole system which is composed of the brake pressure booster 10 and the regulating valve 12 shown in FIG. 1, a position at which the brake pedal is not actuated. Valve seat 38 closes the inlet 20 at which the high pressure from the pressure source 18 is available. The inlet 24 which is connected to the high pressure chamber 14 of the vacuum booster 10 is evacuated in this operating phase (because also the high pressure chamber is evacuated), and air at atmospheric pressure acts at inlet 22. In view of the fact that valve seat 42 is open in the FIG. 2 position, the atmospheric pressure from inlet 22 passes through outlet 26 and conduit 27 to the control valve 28. Yet it cannot get into the high pressure chamber 14 because the control valve 28 has not yet been operated (opened) at this phase of operations.

Therefore, atmospheric pressure prevails in space A of valve 12, and the same pressure as in the high pressure chamber 14 of the vacuum booster 10 prevails in space B of the valve 12, too, the latter being low pressure (e.g. 0.2 bar) when the system is functioning. The active surface areas in the valve which become effective under the various pressures are designated $F_1$, $F_2$, $F_3$ in FIG. 2. The pressures acting in this operating phase produce a closing pressure according to surface areas $F_2$ and $F_3$ at the regulating pistons of the valve so that the pressure furnished by the pressure source 18 is not propagated beyond the inlet 20. The valve consequently is closed to the left against the force of the pressure source 18 corresponding to effective surface area $F_1$.

Let us now assume another operating condition at which the brake pedal is actuated. This will be explained with reference to FIG. 3.

Upon actuation of the brake pedal, air at atmospheric pressure flows through the control valve 28 of the vacuum booster 10 and the open connection between the inlet 22 and the outlet 26 as well as conduit 27 into the previously evacuated high pressure chamber 14 of the vacuum booster 10. The more air the high pressure chamber 14 receives, the more the low pressure diminishes in space B of the valve 12, as compared to the atmospheric pressure which prevails in space A.

A change in pressure ratios now takes place in the regulating valve 12, whereby the closing force which maintains the lockout condition for compressed air at inlet 20 is reduced continuously. As the pressure in the high pressure chamber 14 continues to rise towards atmospheric pressure, the pressure relationship gradually is changed so that the air fed at high pressure from the pressure source 18 to the inlet 20 now can have access to the valve.

Thus the condition illustrated in FIG. 3 is established inside the valve 12. The pressure ratios at effective surface areas $F_2$ and $F_3$ have changed in such a way that the pressurized air opens valve seat 38 by the effective surface area $F_1$. Thereupon the air from pressure source 18, being at a pressure higher than atmospheric pressure, can flow into space C (inside the sleeve 50). Hereby the greatly enlarged effective surface area $F_4$ quickly increases the force effect of the compressed air in axial direction to such an extent that the outer and inner regulating pistons 34, 36 become displaced until the inner regulating piston 34, closing valve seat 42, reaches its axial end position at the right, as seen in the figures.

Once the inner regulating piston 34 has reached this end position shown in FIG. 3, which means that the valve seat 42 is closed, the pressure from pressure source 18 which continues to be applied, causes the valve seat 40 to be lifted (opened). By this opening of valve seat 40, the joint movement of both regulating pistons is stopped, the outer regulating piston 36 continuing to be displaced to the right with respect to the inner regulating piston 34 until it reaches an end position which is defined by the stop 44 of the inner regulating piston 34.

This operating condition is illustrated in FIG. 4. The pressurized air from pressure source 18 now can pass through the inlet 20, the open valve seat 38, open valve seat 40, the transverse bore 46 in the inner regulating piston 34 and the axial bore 48 in the inner regulating piston 34 to the outlet 26 and on through the conduit 27 and the control valve 28 into the high pressure chamber 14 of the vacuum booster 10. At this time, the control valve 28 continues to control the admission of air at positive pressure (higher than 1 bar) into the high pressure chamber 14.

The range of effective pressure differences between the chambers 14, 16 of the vacuum booster thus has been widened continuously up to pressure differences which are determined by the maximum pressure the pressure source 18 can furnish.

When the driver releases the brake pedal in this condition the high pressure chamber 14 of the vacuum booster 10 is linked to the vacuum source by the control valve 28, thereby constantly losing more and more pressure. The ratios of the forces, as defined by effective surface areas $F_1$ to $F_4$, acting inside the regulating valve 12 shift once more so that the valve successively passes through the operating positions explained above, in the opposite sequence.

The valve system specified which acts purely mechanically not only has the advantage of being a compact structure, it is also highly advantageous in situations of failure. For instance, if the vacuum source fails (at inlet 24) the regulating valve 12 automatically switches over to pure pressurized air supply through inlet 20. In this manner, after all, the pressure difference between the high pressure of the pressure source 18 and external atmospheric pressure (e.g. 0.3 bar) remains available for brake pressure boosting in the vehicle.

Failure of the pressure source 18 at the inlet 20 likewise is not synonymous with breakdown of the brake pressure boosting system. Rather, the "normal" pressure difference between the vacuum source and atmospheric pressure remains undisturbed and continues to be available.

It is especially advantageous that the regulating valve 12 is positioned upstream of the conventional control valve 28, as described above, because the control valve thus can exercise its control function also in the high pressure range afforded by the pressure source 18.

Another special advantage of the brake pressure booster and its valve control described above is to be seen in the minimization of leakage loss suffered at the pressure source 18. This means that the pressurized air (the pressure being higher than the outside atmospheric pressure) furnished by the pressure source 18 is being used most economically. Therefore, relatively small reservoir volumes are sufficient.

Leakage loss is avoided as follows with the regulating valve 12 described above: When there is vacuum at the inlet 24 (because a pressure lower than atmospheric still prevails in high pressure chamber 14) valve seat 38 is closed. As the high pressure chamber 14 of the brake pressure booster 10 gradually fills with air, the valve seat 38 begins to lift when a certain filling level is reached, i.e. valve seat 38 opens. This lifting of valve seat 38 is initiated before the closing of valve seat 42 which controls the connection between the atmospheric inlet 22 of the valve and the high pressure chamber 14. In this context it is important that at this particular time valve seat 40 still is closed which controls communication between the pressure source 18 and the high pressure chamber 14. The valve design is such that valve seat 40 does not open until valve seat 42 has closed. The abrupt increase in effective surface area upon opening of the valve seat 38 releases a kind of "chain reaction" at high speed by which inlet 22 is closed immediately and valve seat 40 is opened at once towards the pressure source 18.

Due to this avoidance of leakage losses according to the invention the functional characteristic of the brake pressure booster always is the same, and performance losses which the driver would feel at the brake pedal do not occur.

What is claimed is:

1. A brake pressure booster for a vehicle brake system, comprising a vacuum booster (10) which comprises two chambers (14, 16), the low pressure chamber (16) of which is evacuated during actuation in a brake pressure boosting fashion, while a pressure higher than that in the low pressure chamber (16) is adjustable in the high pressure chamber (14) by means of a control valve (28), the higher pressure corresponding at least to the external atmospheric pressure, a valve (12) disposed upstream of the control valve (28), with respect to the vacuum booster (10), to establish communication between the high pressure chamber (14) and a pressure source (18) when atmospheric pressure is reached in the high pressure chamber (14), the pressure source (18) generating pressure higher than atmospheric pressure in the high pressure chamber (14), the valve (12) having a first inlet (22) for air at atmospheric pressure and a second inlet (24) for air whose pressure corresponds to that in the high pressure chamber (14), the air pressure differential between the first and second inlets (22, 24) opening the valve (12) for establishment of the connection between the pressure source (18) and the high pressure chamber (14) when atmospheric pressure has been reached in the high pressure chamber (14), characterized in that a valve seat (38) controlling access from the pressure source (18) to the valve (12) opens before a valve seat (42) controlling a connection from the second inlet (24) to the high pressure chamber (14) opens, while a valve seat (40) controlling a connection from the pressure source (18) to the high pressure chamber (14) still remains closed, as communication is established between the pressure source (18) and the high pressure chamber (14).

* * * * *

UNITED STATES PATENT AND TRADEMARK OFFICE
CERTIFICATE OF CORRECTION

PATENT NO.   :   5,400,693
DATED        :   MARCH 28, 1995
INVENTOR(S)  :   Peter SCHLUTER et al.

It is certified that error appears in the above-indentified patent and that said Letters Patent is hereby corrected as shown below:

Column 6, line 61, change "second inlet (24)" to --first inlet (22)--;

line 62, change "opens" to --closes--.

Signed and Sealed this

Twenty-eighth Day of May, 1996

Attest:

BRUCE LEHMAN

Attesting Officer      Commissioner of Patents and Trademarks